Patented Dec. 23, 1952

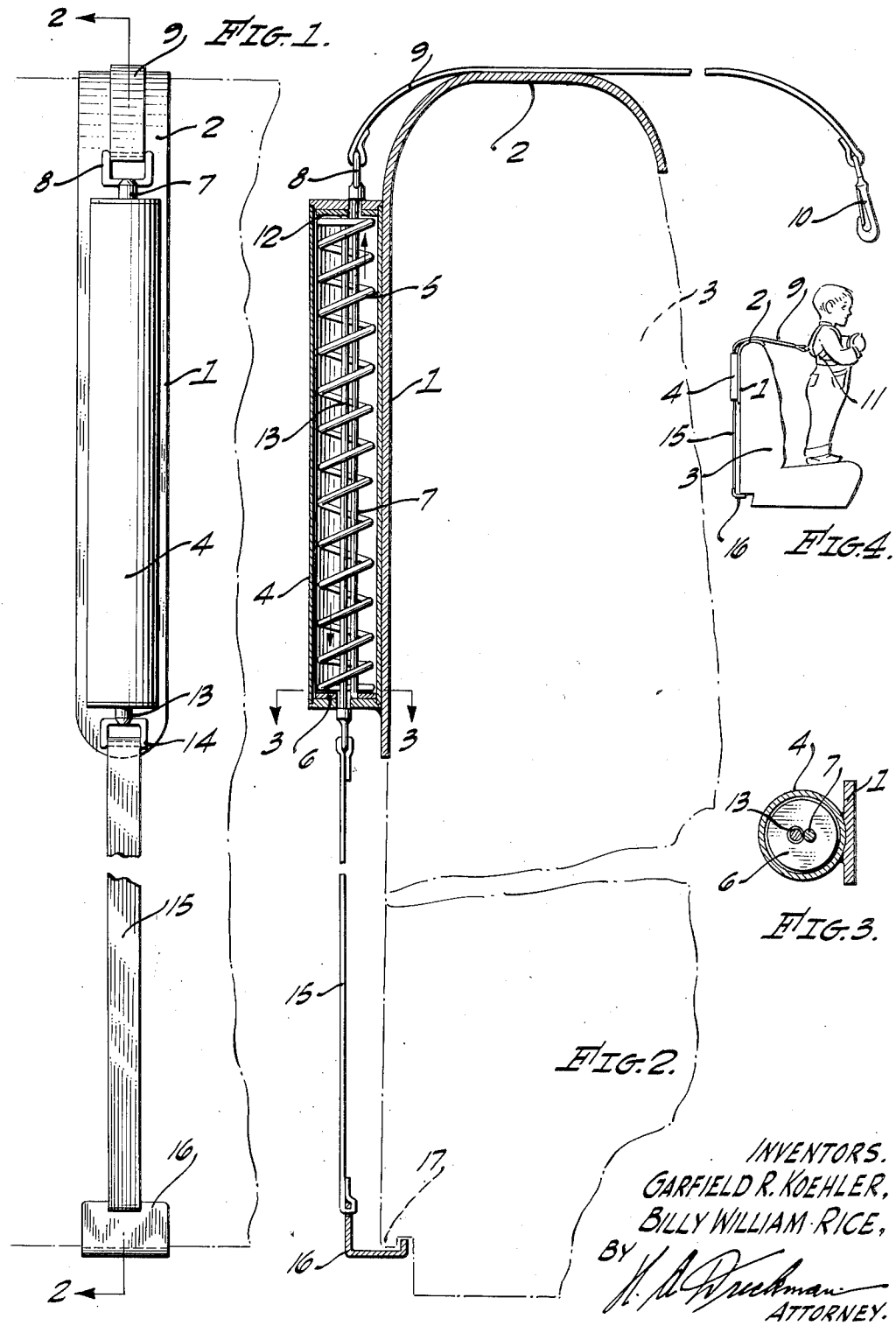

2,622,664

UNITED STATES PATENT OFFICE 2,622,664

CHILD'S RESTRAINING HARNESS FOR AUTOMOBILES

Garfield R. Koehler, Compton, and Billy William Rice, Long Beach, Calif.; said Rice assignor to said Koehler Application January 9, 1950, Serial No. 137,636

2 Claims. (Cl. 155—189)

This invention relates to an improvement in a restraining harness which can be attached to the seat of an automobile, for the purpose of preventing a child from falling forwardly when the brakes of an automobile are applied, or for other reasons of sudden stoppage.

An object of our invention is to provide a novel restraining harness of the character stated, which can be quickly and easily applied to the back of the front seat of an automobile, and which can be quickly attached to the usual leading harness used on small children.

Still another object of our invention is to provide a novel restraining harness, which is simple in construction, inexpensive to manufacture and effective in operation.

Other objects, advantages and features of invention may appear from the accompanying drawing, the subjoined detailed description and the appended claims.

In the drawing:

Figure 1 is a rear elevation of our restraining harness for children.

Figure 2 is a longitudinal sectional view taken on line 2—2 of Figure 1.

Figure 3 is a sectional view taken on line 3—3 of Figure 2.

Figure 4 is a diagrammatic side view of the front seat of a vehicle, with a child standing thereon and showing our harness in use.

Referring more particularly to the drawing, the numeral 1 indicates a narrow strip, preferably formed of a suitable metal, the upper end of which is curved, as shown at 2, so as to fit over the top of the front seat 3 of an automobile.

A tubular housing 4 is fixedly attached to the strip 1, preferably by means of welding, or similar process. A coil spring 5 is mounted in the housing 4, as shown in Figure 2. A washer 6 is positioned in the bottom of the housing 4, and a rod 7 is secured to this washer and extends upwardly through the top of the housing 4.

A loop 8, attached to the upper end of the rod 7, permits the strap 9 to be attached to the upper end of the rod. A snap hook 10, on the end of the strap 9, permits the strap to be attached to the usual harness 11, commonly used on small children. It will be evident that any tension on the strap 9 will tend to compress the spring 5, thus yieldably restraining the child from falling forwardly off of the front seat 3.

A second washer 12, positioned in the upper end of the housing 4, has a second rod 13 fixedly attached thereto. This last named rod extends through the bottom of the housing 4, and is provided with a ring 14, to which a strap 15 is secured. A clip 16 is secured to the lower end of the strap 15, and this clip engages the ledge 17, commonly formed on the bottom of the front seat 3. When the clip 16 is in position, the spring 5 will be under sufficient tension so as to hold the clip 16 in position and also hold the strip 1 in proper position.

To remove the device from the seat, it is only necessary to pull downwardly on the strap 15, to further compress the spring 5, this releases the clip 16 and permits the strip 1, with its hook 2, to be removed from the top of the seat.

Having described our invention, we claim:

1. A child's restraining harness for automobiles comprising a strip formed with an integral hook thereon, said hook adapted to fit over the top of the seat of the automobile, a housing fixedly mounted on said strip, a spring mounted in said housing, a rod engaging the bottom of said spring, said rod protruding from the top of the housing, a strap secured to said rod and fastening means on the strap to attach said strap to a child's harness, a second rod engaging the upper end of said spring, said second rod protruding from the bottom of the housing, a second strap attached to the lower end of the second rod, a clip secured to the second strap, said clip adapted to engage the bottom of the seat of the automobile to hold the restraining harness in position.

2. A child's restraining harness for automobiles comprising a metallic strip formed with an integral hook on the upper end thereof, said hook adapted to extend over the top of the seat of the automobile, a housing fixedly mounted on the back face of said strip, a coil spring positioned in said housing, a rod engaging the bottom of said spring, said rod protruding from the top of the housing, a flexible strap attached to the upper end of the rod, a fastener on the outer end of said flexible strap attachable to a child's harness, a second rod engaging the top of the spring and protruding from the bottom of the housing, a second strap secured to the lower end of the second rod and a hook clip on the lower end of the second strap, said hook clip adapted to engage the bottom of the seat of the automobile.

GARFIELD R. KOEHLER.
BILLY WILLIAM RICE.

REFERENCES CITED

The following references are of record in the file of this patent:

UNITED STATES PATENTS

| Number | Name | Date |
|---|---|---|
| 28,015 | Selden | Apr. 24, 1860 |
| 592,588 | Hollister | Oct. 26, 1897 |
| 894,052 | Radtke | July 21, 1908 |
| 1,629,630 | Miller | May 24, 1927 |
| 1,712,198 | Clapp | May 7, 1929 |
| 2,263,348 | Barros | Nov. 18, 1941 |
| 2,288,692 | Fearson | July 7, 1942 |
| 2,394,523 | Pancoe | Feb. 5, 1946 |